Oct. 26, 1965   J. C. SCHINDLER ETAL   3,214,037
TRASH CART AND CONTAINER
Filed Dec. 31, 1962   5 Sheets-Sheet 1

INVENTORS
James C. Schindler
James C. Callahan, Jr.
BY Horton, Davis,
Brewer & Brugman
Att'ys

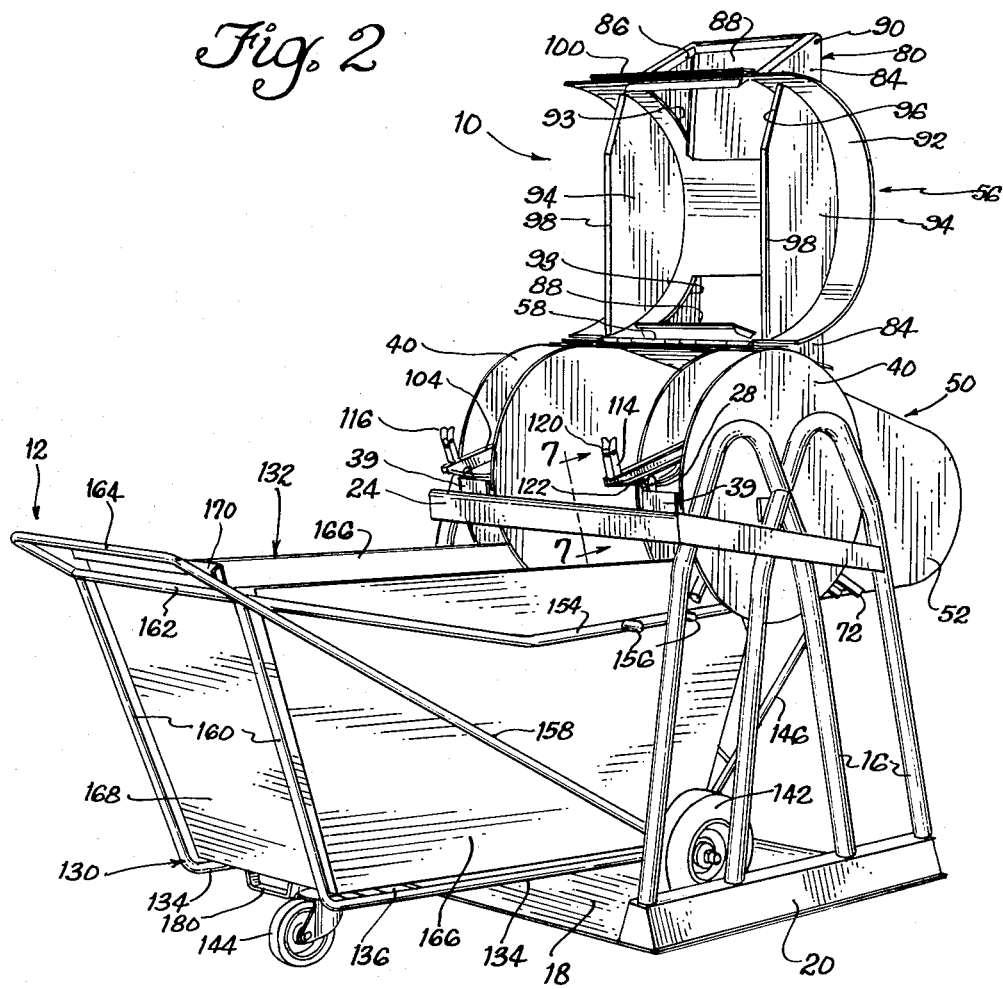
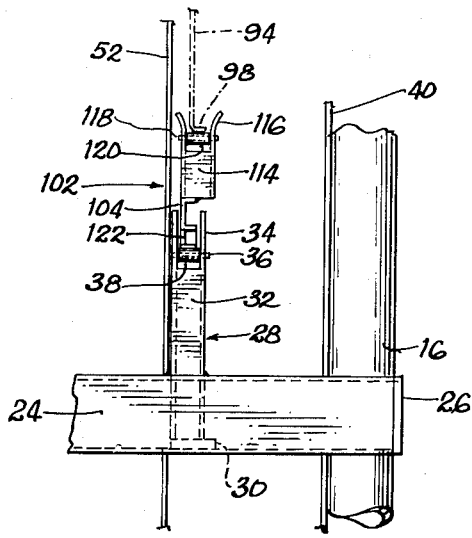

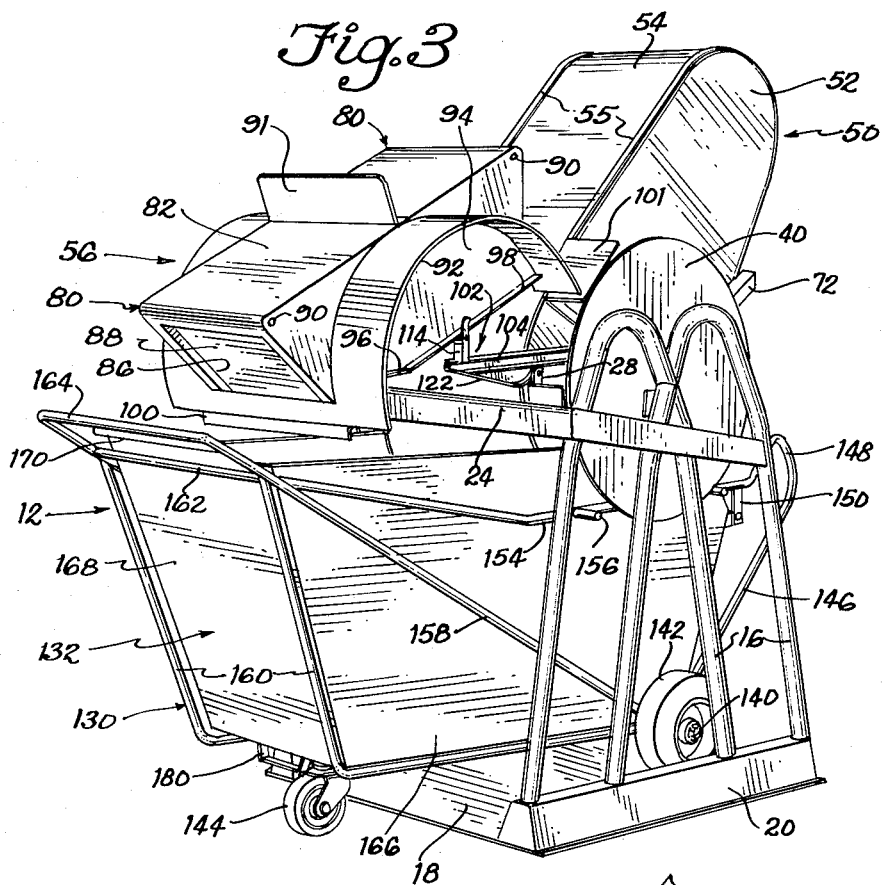
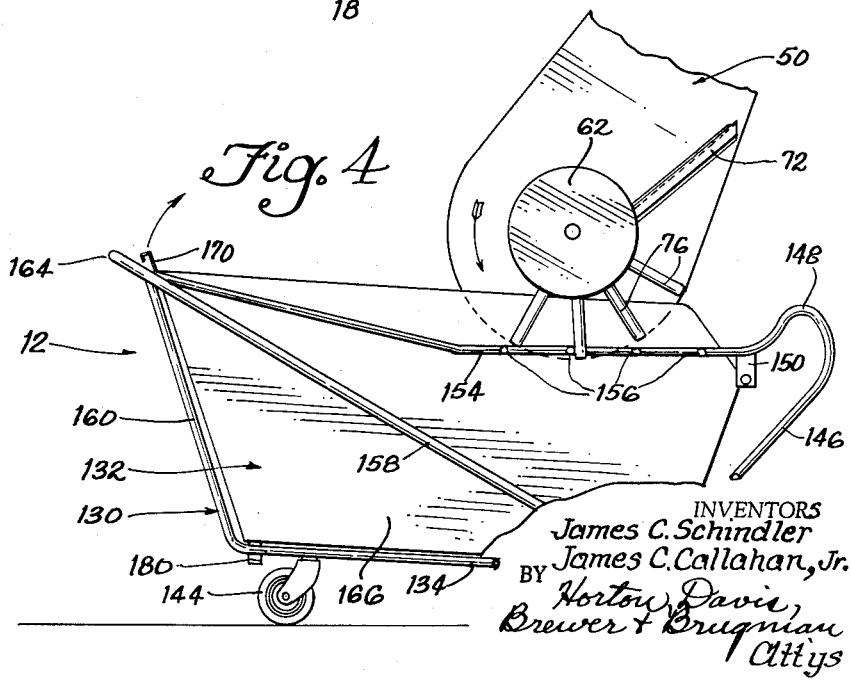

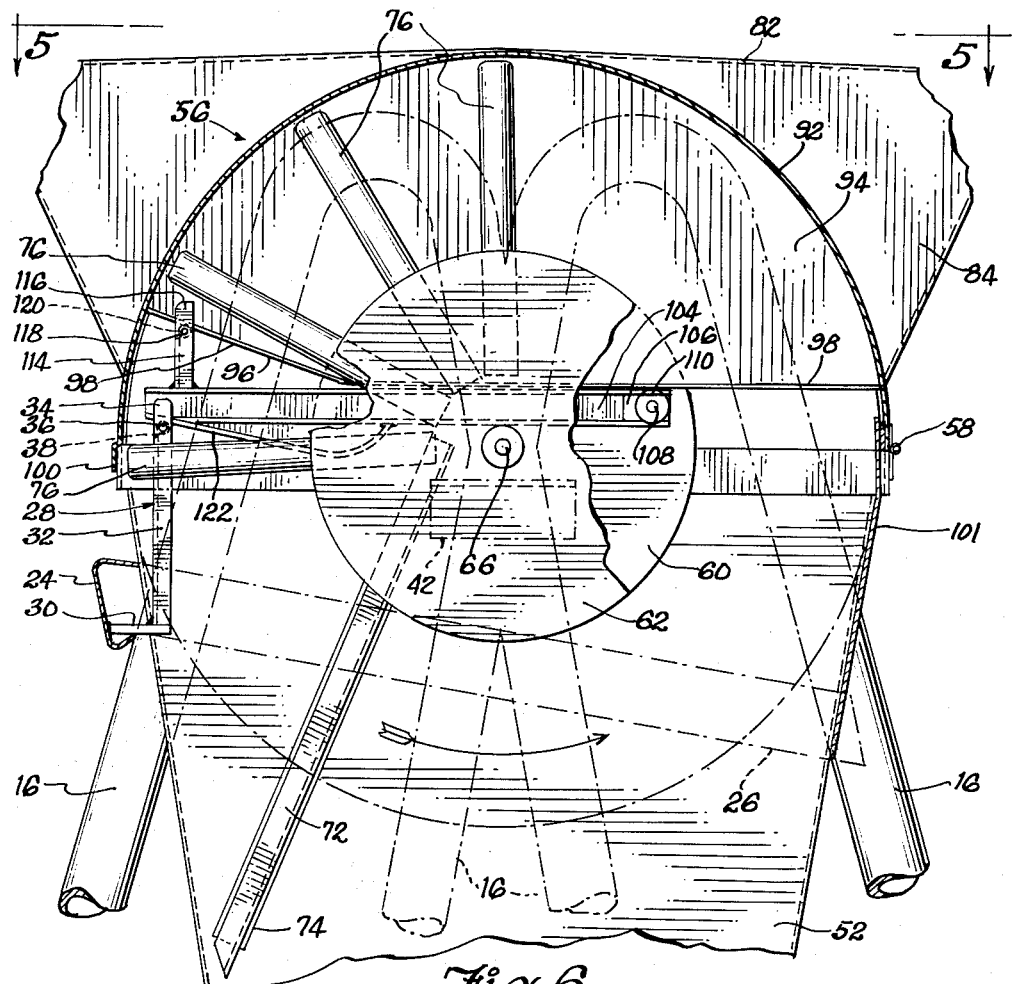
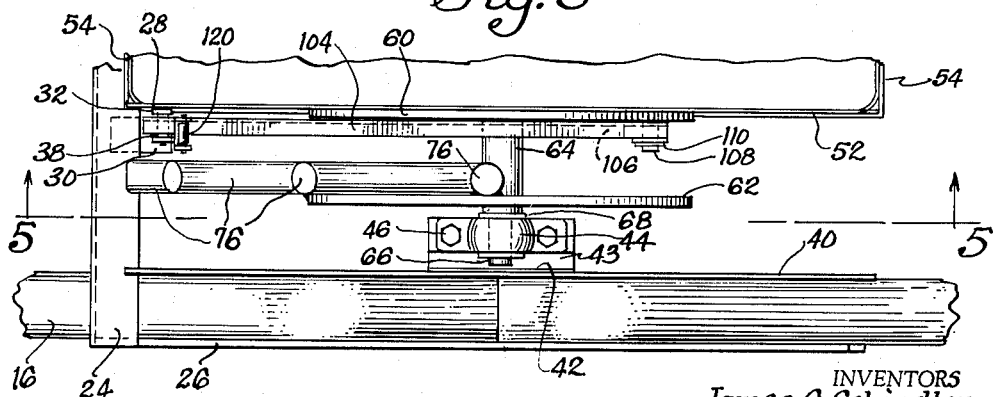

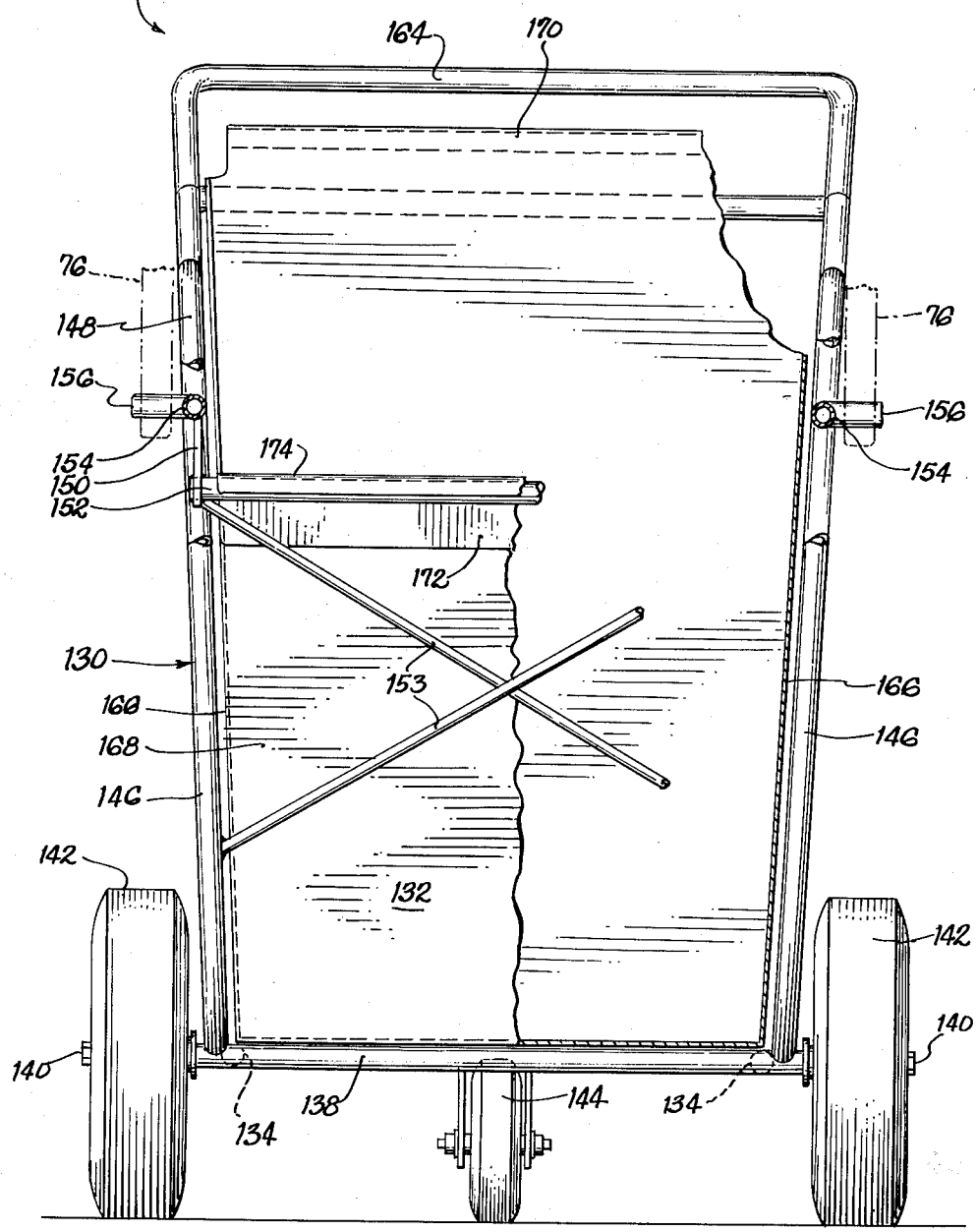

— -

United States Patent Office 3,214,037
Patented Oct. 26, 1965

3,214,037
TRASH CART AND CONTAINER
James C. Schindler, Clarendon Hills, Ill., and James C. Callahan, Jr., Evansville, Ind., assignors, by mesne assignments, to McDonald's Systems Inc., Chicago, Ill., a corporation of Illinois
Filed Dec. 31, 1962, Ser. No. 248,478
5 Claims. (Cl. 214—42)

This invention relates to a combination of a container and a cart, and particularly to a combination of a special container that acts cooperatively with a cart, whereby the cart may automatically empty the container of its contents.

Containers for waste products such as trash are usually made heavy enough to endure long periods of use when exposed to the elements, and to contain wet and frequently corrosive material. When such containers are full, they are heavy and cumbersome to lift, and emptying them is a slow and difficult task. Furthermore, the handling of such garbage or trash in emptying a container is usually a distasteful job.

Particularly at drive-in restaurants and other operations serving foodstuffs which are to be eaten in the immediate vicinity, it is necessary to provide a plurality of suitably spaced and located trash containers. Since they must be emptied periodically, and ofttimes frequently during a single day, it is desirable to make available simple, rapidly emptied containers. The container assembly contemplated by this invention, and the cart assembly with which it is adapted to cooperate, empties quickly and surely, and is ideal for drive-in restaurant use although, of course, there are many other environments in which the container assembly is also useful.

It is therefore a primary object of this invention to provide a container, as for trash, suitable for outdoor use, that may be rapidly emptied without lifting or carrying.

This invention also contemplates, as an object, the provision of a novel container assembly which is cooperable with a complementary cart assembly to facilitate the rapid emptying of the container itself without lifting or manually moving the container and without the necessity of handling or otherwise coming into contact with the contents.

Yet another object of this invention is to provide a covered container, as for trash, that may be emptied and dumped into a cooperatively acting cart without it being necessary for the operator to lift the cover, to lift the container, or to come into contact with the contents of the container.

Yet another object of this invention is the provision of a trash container peculiarly adapted to outside use in the environment of drive-in restaurants and similar food dispensing operations, which trash container is oscillatably supported and has engaging means adapted to cooperate with complementary engaging means on a cart, whereby when said container engaging means and said complementary cart engaging means come into contact, they begin to oscillate said trash container into a position in which it dumps its contents into said cart.

This invention will be best understood by referring to the accompanying drawings. Other objects and advantages, in addition to those already mentioned, will become apparent from the following description and drawings of which:

FIG. 2 is a perspective view of a cart assembly in engagement with the container assembly of FIG. 1, with the lid in a fully open position;

FIG. 3 is a perspective view of a cart assembly in engagement with the container assembly of FIG. 1, showing the container assembly in a dumping position;

FIG. 4 is a partial side view similar to FIG. 3 showing the cooperative relationship between the cart assembly and the container assembly more clearly;

FIG. 5 is a partial plan view of FIG. 1 with the container lid removed to facilitate an examination of the container assembly operating mechanism;

FIG. 6 is a side sectional view taken substantially along line 5—5 of FIG. 5 and showing certain of the elements of FIG. 5 in phantom, and including the container lid;

FIG. 7 is a partial front elevation taken substantially along line 7—7 of FIG. 2 showing the guiding mechanism for the container lid;

FIG. 9 is a front view, partially in section, of the cart assembly of FIGS. 2, 3 and 4.

Figure 1:
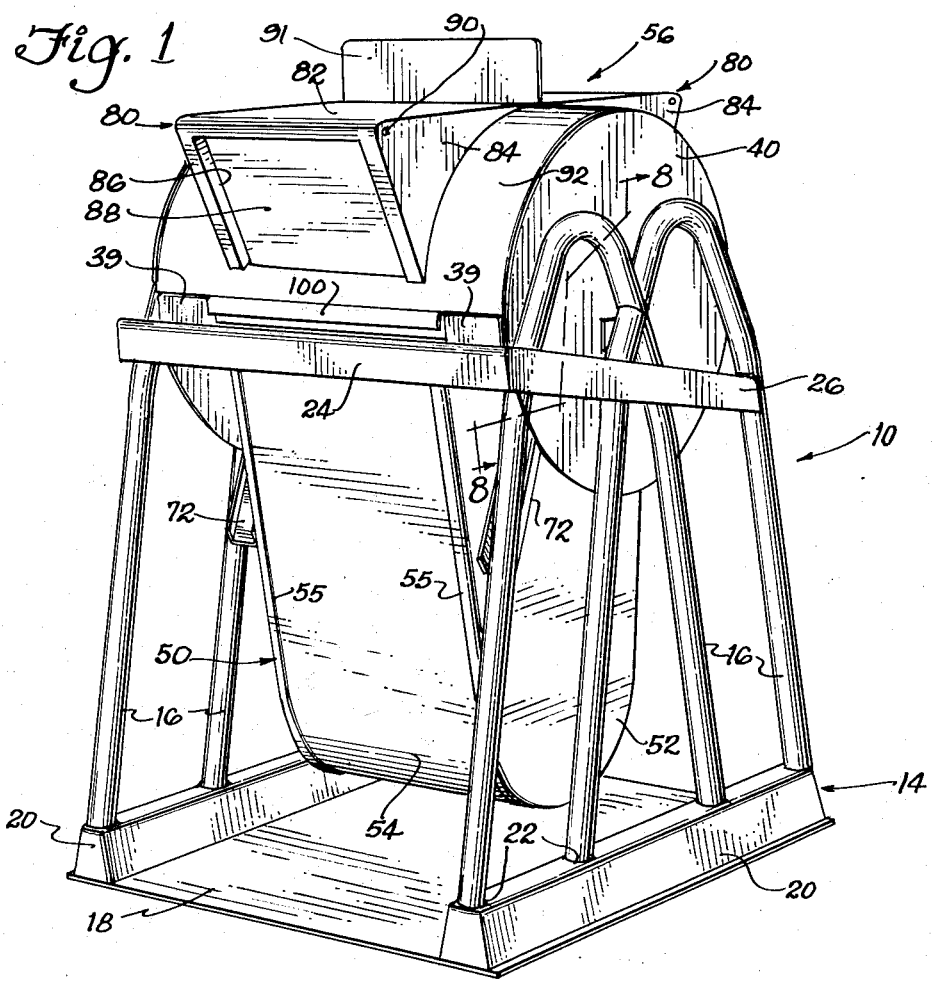
FIG. 1 is a perspective view of one embodiment of the container assembly of this invention.
Figure 8:
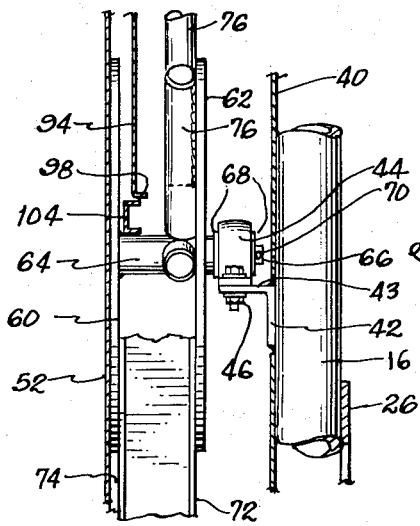
FIG. 8 is a front elevation partially in section taken substantially along line 8—8 of FIG. 1.

The presently preferred embodiment of this invention, as shown in FIGS. 1 to 9, includes a container assembly generally designated as 10 and a cart assembly generally designated at 12.

The container assembly 10 includes a container supporting structure 14. Container supporting structure 14 consists of horizontally spaced stanchions 16 supported by and raising from stanchion base 18. Stanchion channels 20 are welded to stanchion base 18 at opposite sides thereof and each has a plurality of holes 22 therein to receive the lowermost ends of stanchions 16. Stanchions 16 are welded to stanchion base 18 and to stanchion channels 20.

To help maintain stanchions 16 in their upright spaced relationship, a horizontal upper channel 24 welded at opposite ends to stanchions 16 is provided. Two reinforcing bars 26 extend rearwardly and somewhat downwardly from horizontal upper channel 24 and are welded to stanchions 16, and, at their forward ends, to the ends of horizontal upper channel 24 to assist in stabilizing and rigidifying the container supporting structure 14.

In addition to its reinforcing and spacing functions, horizontal upper channel 24 serves to mount stationary guides 28 (see FIG. 7). Those guides are spaced inwardly of the ends of horizontal upper channel 24 a predetermined distance from each other for a purpose to be described. The stationary guides 28, mirror images of each other, comprise guide feet 30 welded to horizontal upper channel 24. To each of the feet 30 an upstanding guide section 32 is welded and at the upper end of each upstanding guide section 32 a segment of the central web is cut out to form a fork 34 between the upstanding arms of which a horizontal steel mounting pin 36 rotatably mounting a nylon roller 38 is provided. Shield plates 39 (not shown in FIG. 7) which are connected to guide sections 32 serve to reinforce the guides 28 and to protect them from damage and the elements.

A side shield 40 is connected to the inside of the stanchions 16. Mouting angles 42 having inwardly extending flanges 43 are suitably connected to the stanchions and side shields 40. Each flange 43 supports a pillow block 44. Pillow blocks 44 are horizontally spaced and are aligned so that the center line of the bore of each lies on a common axis. The pillow blocks are connected to each of the flanges 43 by suitable fastening means such as nuts and bolts 46. Pillow blocks 44 serve to oscillatably mount the container in a manner to be described.

The container assembly 14 also includes a container 50 having side panels 52 and a central panel 54 which serves as the front, rear and bottom of the container 50. Side panels 52 include flanges 55 along the sides and bottom of their perimeters which are adapted to overlie the edges of central panel 54 so that side panels 52 and central panel 54 may be suitably connected to each other, such as by riveting. A container lid 56 is pivotally connected to container 50 by means of a hinge 58.

The mechanism for oscillating, hence dumping, the container in the manner to be described includes two portions which are mirror images of each other, one at each side of container 50. Each includes a side plate 60, circular in shape, welded to the outside of each of the container side panels 52. (See FIGS. 5, 6 and 8 especially). A second or outer plate 62, also circular in shape, is spaced outwardly from each of the side plates 60 and is connected to the side plates 60 by plate connecting rods 64. As may be seen from FIGS. 5 and 8 plate connecting rods 64 extend through outer plates 62 a short distance. Since the oscillating mechanisms on each side of the container are mirror images, and since they are intended to operate together, plate connecting rods 64 are coaxial. So also are container mounting axles 66 which extend outwardly of plate connecting rods 64 coaxial. Container mounting axles 66 are located above the center of gravity of container 50 so that in its stable position it will have its closed end down and its open end up. To facilitate oscillatable mounting of the container 50 on supporting structure 14, mounting axles 66 are provided with axle washers 68 and cotter pin holes 70, through which cotter pins may be disposed to retain container 50 on supporting structure 14 and in their respective pillow blocks 44 in which they are rotatably received.

Also provided as part of the oscillating mechanism on each side of the container are cart bumper engaging channels (bumper channels) 72. Bumper channels 72 are welded at their upper ends between plates 60 and 62 and at their lower ends, on the inside arm of the bumper channels to spacing bars 74 which extend downwardly from side plates 60 along side panels 52. Spacing bars 74 are welded to side panels 52.

A plurality of container teeth 76 are welded to the inside of each of the outer plates 62. Container teeth 76 are bars, circular in cross-section, which are radially disposed with respect to container mounting axles 66 and which are spaced to cooperate with teeth mounted on the cart assembly as will be described.

Container lid 56 which is hingedly mounted by hinge 58 at one end to container 50 includes two disposal sections 80, one at the front and one at the rear of the container lid. Each of the disposal sections 80 includes a common upper element 82, individual side elements 84, and define at their respective fronts generally vertical windows 86. Widows 86 are provided with swinging doors 88, through which trash is intended to be introduced, pivotally mounted adjacent the points at which the upper element 82 and the side elements 84 meet. swinging doors in their normal position of rest remain closed due to gravity and for that reason close windows 86. Pivot pins for doors 88 are shown at 90 and are connected to doors 88 so that they may be moved inwardly when trash is to be introduced. Optionally a container lid sign 91 may be provided atop the lid for use in displaying any desired intelligence.

The container lid also includes generally semi-circular outwardly extending shields 92. As best seen in FIG. 2, shields 92 are interconnected by a central segment and by front and rear segments which define generally rectagular windows 93. Windows 93 are dimensioned so that doors 88 may move inwardly to facilitate the introduction of trash through windows 86. Shields 92 terminate along their entire outer edges closely adjacent side shields 40. To each shield 92 a vertically disposed lid side panel 94 is connected along its upper periphery. The forward end of each lid side panel 94 is undercut as at 96 so that when the container assembly is in its vertical position of rest, the lid will be enabled to close and clear the movable lid guides, as will become apparent. Extending along the entire lower edge of each of the container side panels 94 and integral therewith is an outwardly extending reinforcing flange 98 which is adapted to engage the movable lid guides. So also is the front edge of container lid 56 provided with a front lip 100. Thus, when the container is in its position of rest, lid 56 closes and covers the entire open end of container 50 by means of hinge 58, by means of lid side panels 94 which overhangs the upper ends of container side panels 52, and by means of lip 100.

In addition rear plates 101, as best seen in FIG. 3, are provided to cover and shield the rear of the oscillating mechanisms. Plates 101 are connected to basket 50.

Movable lid guides 102 are provided at each side of container 50. They include movable guide pivot arms 104 shown as channels. (See FIGS. 2, 5, 6 and 7). The pivot end of pivot arms 104 are provided with channel filler blocks 106 (FIG. 6) welded therein and through which pivot rods 108 extend. Pivot rods 108 are press fit in side plates 60 and extend through pivot arms 104, through channel filler blocks 106, and at their outer ends are provided with washers 110 which are retained in position by suitable pins (not shown). Slightly rearwardly spaced of the forward ends of pivot arms 104, upstanding guide channels 114 are welded thereto. Guide channels 114 include fork elements 116 spanned by horizontally disposed pins 118. On each pin 118 a roller 120 made of a suitable material such as nylon is provided. Rollers 120 are adapted to underlie and engage reinforcing flanges 98 as the container is being dumped. In turn rollers 38 of stationary guides 28 are adapted to engage and support pivot arms 104 and cam plates 122 during the dumping operation. For those reasons, movable lid guides 102 must be spaced from each other so that flanges 98 will be engaged as dumping begins, and stationary guides 28 must be spaced from each other so that pivot arms 104 will be engaged by rollers 38 of the stationary guides. The cam plates 122 which are connected to the forward bottom end of pivot arms 104 serve to cam the container lid upwardly as tilting and oscillating of the container begins.

Since the opening and closing of the trash container 50 and the operation of container assembly 10 is best understood when the manner of its cooperation with the cart assembly is appreciated, the cart assembly itself will be next described.

The cart assembly 10 includes a cart supporting frame and a cart basket, the cart basket being generally designated as 130.

The supporting frame includes a floor comprising longitudinal floor rods 134, a transverse floor beam 136 and a tubular transverse floor beam 138 spaced from beam 136. The floor members 134, 136 and 138 are welded to each other. Stub axles 140 are connected to beam 138 and extend outwardly one from each side of beam 138. Each stub axle is adapted to rotatably mount a wheel 142 which may be of any suitable type such as, for example, a wheel bearing an inflatable tire. Longitudinally spaced from wheels 142, and pivotally and vertically mounted on transverse floor member 136 is a caster 144. The caster is mounted and adapted to pivot on a vertical axis and to rotate on a horizontal axis.

The cart basket supporting structure also includes cart bumper carrying members 146 which are connected at their lower ends to longitudinal floor rods 134 and which include cart bumpers 148. Bumpers 148 serve to engage and cam container assembly 12 and to initiate oscillation of the container itself preparatory to dumping thereof, all as will be described. For that reason bumpers 148 should be sufficiently smooth so that when they engage cart bumper engaging channels 72, smooth sliding contact and engagement is possible. Also to facilitate ease of operation cart bumpers 148 should engage channels 72 well below container mounting axles 66, thereby requiring less force to oscillate the container. Of course the height at which engagement between the bumpers 148 and channels 72 occurs will depend also upon the dimensions of other portions of the container oscillating mechanisms. Finally, it should be mentioned that cart bumpers 148 are spaced laterally a distance which is proper to insure their accurate engagement simultaneously with both channels 72.

To assist in maintaining a predetermined spacing between cart bumpers 148, as well as to facilitate emptying cart basket 132, vertical posts 150 are welded to cart bumper carrying members 146. (See especially FIG. 9.) These posts support a transverse pivot rod 152 therebetween which is welded at each end to one of the posts 150. And, extending diagonally between posts 150 and cart bumper carrying members 146, tie rods 153, welded at their respective ends to the posts and to members 146, are provided. Those serve to provide a strong rigid forward cart supporting structure.

Cart teeth carrying members 154 extends rearwardly from cart bumpers 148. Each carries a plurality of cart teeth 156 uniformly spaced and extending outwardly from a generally horizontal segment of members 154. The teeth 156 are welded to members 154 and are spaced and arranged to engage container teeth 76 as will be described.

To assure rigidity, reinforcing diagonal side struts 158 are provided. These are connected at one end adjacent the intersection of longitudinal floor rods 134 and cart bumper carrying members 146. Near their other ends, reinforcing struts 158 are connected to the supporting frame near the intersection of cart teeth carrying members 154, rear vertical frame members 160, and upper spacing rod 162. Reinforcing diagonal side struts terminate at their upper ends in a transverse cart handle 164.

Cart basket 130 itself includes cart side panels 166 and a central cart panel 168 joined along their edges to form a substantially watertight cart basket. Central panel 168 terminates at its upper rearward edge in a flange 170. The upper forward edge of central panel 168 is provided with a plate 172 terminating forwardly of the cart basket in a semi-circular sleeve 174 extending the width of the cart basket. Sleeve 174 is adapted to rest upon transverse pivot rod 152 to enable dumping of cart basket 132 itself. Sleeve 174 and the forward upper edge of central panel 168 are sufficiently low so that the cart may underride the container 50 as it is oscillated by the cart, so that container 50 may overlie the cart when it is in dumping position. (See FIGS. 2 and 3 and particularly FIG. 4.)

In its normal orientation cart basket 130 is pivotally supported upon pivot rod 152, and the floor of the cart basket at its forward end is elevated above transverse floor beam 138. However at its rearward end, the floor of cart basket 132 rests upon transverse floor beam 136. Thus flange 170 lies above cart handle 164, facilitating grasping flange 170 whereby the cart basket may be oscillated about transverse pivot rod 152 when it is necessary to empty the basket. To bring the basket back from a dumping position a handle 180, connected beneath the rear of basket 132, is provided.

In use, the container assembly 10 in its normal position (FIG. 1) is adapted to receive trash through windows 86 by pushing against doors 88. When the container has become sufficiently full or when it is desired to empty container 50 for any reason, the cart assembly 12 is brought to a position adjacent the container assembly.

Then the operator rolls cart assembly 12 forward until cart bumpers 148 engage cart bumper engaging channels 72. The operator continues to push the cart assembly forward and as he does so wheels 142 enter upon and ride upon stanchion base 18. As the cart assembly continues its forward movement, container 50 begins to pivot or oscillate upon its axles 66 and with respect to the container supporting structure 14. So also do plates 60, fixed to container 50, begin to rotate therewith. As that occurs, movable guide pivot arms 104, pivotally mounted on side plates 60, and then cam plates 122, move forward and are rollingly engaged by rollers 38 of stationary guides 28. So also do the rollers 120 of movable lid guides 102 engage the reinforcing flanges 98 at the undercut lid side panel ends 96 of lid side panels 94. The rolling engagement between rollers 38 and pivot arms 104 (and cam plates 122), and rollers 120 and flanges 98 continues throughout substantially the oscillation of container 50 thereby opening container lid 56 and holding it away from the top of container 50 in the manner best seen in FIG. 3. Hinge 58 enables the lid to be moved and held away from the body of container 50.

FIGS. 2, 3 and 4 shows progressive oscillation of the container. They make clear the fact that the cart basket must be proportioned at its forward end to allow it to underride container 50 as the cart moves forward. It is apparent that as the cart assembly is pushed further toward against bumper channels 72, the first of the container teeth 76, on each side of the container, meets the first of the cart teeth 156 on each side of the cart. Since both the cart and the container operating mechanisms are mirror images, engagement at both sides occurs simultaneously. As firm engagement between those first teeth is brought about, and as the cart continues to be moved forward, engagement between the cart bumpers 148 and cart bumper channels 72 is terminated because bumpers 148 pass beneath the lowermost ends of channels 72. As the forward motion of the cart continues, rotation of the container 50 about the axis defined by axles 66 continues until the second teeth on each side of the container and cart engage, after which the first teeth disengage. That continues until the fourth teeth of each have engaged or forward movement of the cart is stopped and the container 50 is substantially inverted (substantially as shown in FIGS. 3 and 4) thereby enabling its entire contents to be discharged by gravity into the cart basket without interference from lid 56 which is held away in the manner described and illustrated in FIG. 3. The container is prevented from overturning by stopping forward movement of the cart and by the lid contacting the cart.

Thus it is seen that the teeth of the cart and the teeth of the container interengage and drive and rotate the container in the manner of a rack and pinion or gear respectively.

When dumping has been completed, cart assembly 12 is withdrawn, the container 50 gradually returning to its trash receiving vertical position as shown in FIG. 1. During the return, the cart assembly 12 and container assembly 10 cooperate in precisely the opposite manner described with respect to the dumping operation.

When the cart assembly 12 itself is to be emptied that may be done by grasping flange 170 and lifting it in the direction shown by the arrow in FIG. 4 so that cart basket 132 pivots about transverse pivot rod 152 until the basket has been so elevated that its contents discharge over the cart sleeve 174 end of cart basket 132.

A preferred embodiment of devices constructed in accordance with this invention, as well as the operation of those devices, has been described in some detail. That embodiment is however only illustrative of this invention. It will be apparent to those skilled in the art that many modifications may be made in the structures and methods described without departing from the spirit of the invention. For that reason it is intended that the invention be limited only insofar as the claims appended hereto may make it necessary.

We claim:

1. A trash container assembly adapted to be dumped by cooperating cart means, said trash container assembly comprising a frame, a trash container, said container having an open end, axle means oscillatably supporting said container on said frame, a lid pivotally connected to said container assembly for covering said open end, said lid including a trash disposal section defining a window and having a door pivotally connected thereto, said door being normally urged into a window covering position but being displaceable so that trash may be inserted through said window and into said container, gear means connected to said container and engageable with said cooperating cart means for oscillating said container on said axle means to a position where trash is dumped by gravity through said open end, and means connected to said container assembly for holding said lid away from its open end covering position and for causing said lid to pivot with respect to said container assembly as said container is oscillated to its trash dumping position, said means for holding said lid in a position removed from its open end covering position including roller means rollingly engaging said lid.

2. In a trash disposal means a trash container supporting structure, a trash container oscillatably suspended upon said supporting structure, a first engaging means operatively connected to said trash container and fixed thereto to oscillate with said trash container, a wheeled cart, second engaging means connected to said cart and adapted to engage said first engaging means, said trash disposal means being such that as said second engaging means is urged against said first engaging means the trash container oscillates with respect to said trash container supporting structure, said first engaging means including pinion means and a bumper contacting member, said second engaging means including rack means and a bumper.

3. In trash disposal means a trash container supporting structure, an open-topped trash container oscillatably suspended upon said supporting structure, a first engaging means operatively connected to said trash container and secured thereto to oscillate said trash container, said trash container terminating at its lower end closely adjacent a horizontal surface upon which said trash container supporting structure is disposed, an open-topped wheeled cart rollingly supported upon said horizontal surface and extending substantially vertically above said lower end of said trash container, second engaging means connected to said cart and adapted to directly engage said first engaging means, said trash container being oscillated by said second engaging means as said second engaging means is urged against said first engaging means to move the lower end of said trash container to an elevation above the open top of said cart and to invert said trash container so that its open end is disposed above said cart and in dumping position with respect to said cart when said cart has been moved into a trash receiving position.

4. In trash disposal means a trash container supporting structure, a trash container having an openable top and a bottom and being oscillatably suspended from said supporting structure, a first engaging means operatively connected to said trash container and fixed thereto to oscillate with said trash container, a wheeled cart, second engaging means connected to said cart and adapted to engage said first engaging means, said trash disposal means being such that as said second engaging means is urged against said first engaging means the trash container oscillates with respect to said trash container supporting structure, said trash cart including a trash basket having a forward wall extending upwardly above said trash container bottom as said second engaging means engages said first engaging means, said forward wall being proportioned to underride said trash container as said trash container is oscillated by said first and second engaging means into a trash dumping positions.

5. In trash disposal means, a trash container supporting structure, a downwardly extending open-topped trash container oscillatably suspended upon said supporting structure, a first engaging means operatively connected to said trash container and fixed thereto to oscillate with said trash container, an open-topped upwardly extending wheeled cart, second engaging means connected to said cart and adapted to engage said first engaging means, the lowermost end of said downwardly extending trash container extending beneath the uppermost end of said upwardly extending cart when said first and second engaging means are out of contact, said trash disposal means being such that as said second engaging means is urged against said first engaging means said trash container oscillates with respect to said trash container supporting structure and said lowermost end of said trash container moves to a position above the uppermost portion of said upwardly extending cart and said cart underlies the open top of said trash container.

References Cited by the Examiner
UNITED STATES PATENTS

| | | | |
|---|---|---|---|
| 96,428 | 11/69 | Harrison | 214—42 |
| 370,624 | 9/87 | Hulett | 214—42 |
| 687,491 | 11/01 | Ayres. | |
| 877,963 | 2/08 | Suck | 214—42 |
| 1,420,681 | 6/22 | Billings et al. | 214—41 |
| 1,554,272 | 9/25 | Garcia | 214—42 |
| 1,740,743 | 12/29 | Oettle | 214—42 |
| 1,849,671 | 3/32 | Holme | 214—41 |
| 1,898,021 | 2/33 | Schellentrager | 214—41 |
| 2,303,067 | 11/42 | Richard | 220—18 X |
| 2,311,422 | 2/43 | Walling | 280—47.34 |
| 3,023,021 | 2/62 | Fricke et al. | 280—47.34 |

GERALD M. FORLENZA, *Primary Examiner*

HUGO O. SCHULZ, *Examiner.*

UNITED STATES PATENT OFFICE
CERTIFICATE OF CORRECTION

Patent No. 3,214,037

October 26, 1965

James C. Schindler et al.

It is hereby certified that error appears in the above numbered patent requiring correction and that the said Letters Patent should read as corrected below.

In the grant, lines 3 and 13, and in the heading to the printed specification, line 5, for "McDonald's Systems Inc.", each occurrence, read -- McDonald's System, Inc. --; column 3, line 47, for "Widows" read -- Windows --; line 51, for "swinging" read -- Swinging --; column 5, line 15, for "extends" read -- extend --; column 6, lines 14 and 15, for "toward" read -- forward --; column 8, line 13, for "positions" read -- position --.

Signed and sealed this 10th day of May 1966.

(SEAL)
Attest:

ERNEST W. SWIDER
Attesting Officer

EDWARD J. BRENNER
Commissioner of Patents